US012771906B2

(12) United States Patent
Panchaksharaiah et al.

(10) Patent No.: US 12,771,906 B2
(45) Date of Patent: Oct. 20, 2026

(54) SYSTEMS AND METHODS FOR SCENE CHANGE RECOMMENDATIONS

(71) Applicant: Adeia Guides Inc., San Jose, CA (US)

(72) Inventors: Vishwas Sharadanagar Panchaksharaiah, Karnataka (IN); Vikram Makam Gupta, Bangalore (IN)

(73) Assignee: Adeia Guides Inc., San Jose, CA (US)

( * ) Notice: Subject to any disclaimer, the term of this patent is extended or adjusted under 35 U.S.C. 154(b) by 258 days.

(21) Appl. No.: 18/659,993

(22) Filed: May 9, 2024

(65) Prior Publication Data

US 2026/0019668 A1 Jan. 15, 2026

Related U.S. Application Data

(63) Continuation of application No. 18/117,671, filed on Mar. 6, 2023, now Pat. No. 12,015,823, which is a continuation of application No. 17/191,298, filed on Mar. 3, 2021, now Pat. No. 11,622,152, which is a continuation of application No. 16/454,722, filed on Jun. 27, 2019, now Pat. No. 10,972,792.

(51) Int. Cl.
*H04N 21/454* (2011.01)
*G06V 20/40* (2022.01)
*H04N 21/4545* (2011.01)

(52) U.S. Cl.
CPC ......... *H04N 21/4542* (2013.01); *G06V 20/41* (2022.01); *G06V 20/48* (2022.01); *H04N 21/45457* (2013.01); *G06V 20/44* (2022.01)

(58) Field of Classification Search
CPC ......... H04N 21/4542; H04N 21/45457; H04N 21/44222; H04N 21/4667; H04N 21/44008; G06V 20/41; G06V 20/48; G06V 20/44
See application file for complete search history.

(56) References Cited

U.S. PATENT DOCUMENTS 7,127,152 B2 * 10/2006 Van Den Enden .. G11B 27/005 386/346
8,881,010 B2 * 11/2014 Soldan .................. G11B 27/34 704/275
9,578,290 B2 2/2017 Isaji
9,607,656 B1 3/2017 Serce
9,615,124 B1 * 4/2017 Gupta ............... H04N 21/4858
10,147,461 B1 12/2018 Bates et al.
10,972,793 B2 * 4/2021 Panchaksharaiah ......................... H04N 21/4542
11,622,152 B2 4/2023 Panchaksharaiah et al.
(Continued)

FOREIGN PATENT DOCUMENTS

CA 2775674 A1 10/2001

*Primary Examiner* — Nathan J Flynn
*Assistant Examiner* — Christine A Kurien
(74) *Attorney, Agent, or Firm* — HG LAW LLP

(57) ABSTRACT

Systems and methods are disclosed for indicating whether a scene in a media asset corresponds to a scene for which a scene change was previously requested. A media player client monitors scene sequences in a media asset to anticipate whether the user will initiate a scene change request based on historical scene change data. In response to detecting a scene sequence for which the user is expected to request a scene change, the media player client determines whether a scene change is necessary and outputs an indication of whether a scene change is recommended.

20 Claims, 9 Drawing Sheets

(56) References Cited

U.S. PATENT DOCUMENTS

| | | | | |
|---|---|---|---|---|
| 12,015,823 | B2 | 6/2024 | Panchaksharaiah et al. | |
| 2002/0108112 | A1* | 8/2002 | Wallace | G11B 27/28 725/38 |
| 2003/0126599 | A1* | 7/2003 | Novak | G11B 27/34 348/E7.071 |
| 2005/0066357 | A1 | 3/2005 | Ryal | |
| 2005/0188408 | A1* | 8/2005 | Wallis | H04N 21/426 725/86 |
| 2006/0110136 | A1 | 5/2006 | Abecassis | |
| 2008/0107402 | A1* | 5/2008 | Angiolillo | H04N 21/47217 386/234 |
| 2008/0317433 | A1* | 12/2008 | Hamada | H04N 5/783 386/E5.052 |
| 2012/0042247 | A1 | 2/2012 | Harper et al. | |
| 2012/0311625 | A1 | 12/2012 | Nandi | |
| 2014/0020017 | A1* | 1/2014 | Stern | H04N 21/812 725/34 |
| 2014/0181667 | A1* | 6/2014 | Chen | H04N 21/84 715/716 |
| 2014/0237501 | A1* | 8/2014 | Berrier | H04N 21/4542 725/25 |
| 2015/0188964 | A1 | 7/2015 | Sharma et al. | |
| 2017/0006252 | A1* | 1/2017 | Patel | G11B 27/005 |
| 2017/0366859 | A1* | 12/2017 | Chimayan | H04N 21/47217 |
| 2018/0206004 | A1* | 7/2018 | Joong | H04N 21/8456 |
| 2018/0270536 | A1 | 9/2018 | Lefevre et al. | |
| 2018/0316962 | A1* | 11/2018 | Prakash | G11B 27/34 |
| 2019/0146651 | A1* | 5/2019 | Williams | G06F 3/0482 715/720 |
| 2020/0097731 | A1* | 3/2020 | Gupta | H04N 21/4667 |
| 2020/0128294 | A1* | 4/2020 | Gupta | H04N 21/44222 |
| 2020/0213676 | A1* | 7/2020 | Naik Raikar | H04N 21/2387 |
| 2020/0413142 | A1 | 12/2020 | Panchaksharaiah et al. | |
| 2020/0413143 | A1 | 12/2020 | Panchaksharaiah et al. | |
| 2021/0235159 | A1 | 7/2021 | Panchaksharaiah et al. | |
| 2023/0283846 | A1 | 9/2023 | Panchaksharaiah et al. | |

* cited by examiner

300

400

SYSTEMS AND METHODS FOR SCENE CHANGE RECOMMENDATIONS

This application is a continuation of U.S. patent application Ser. No. 18/117,671, filed Mar. 6, 2023, which is a continuation of U.S. patent application Ser. No. 17/191,298, filed Mar. 3, 2021, now U.S. Pat. No. 11,622,152, which is a continuation of U.S. patent application Ser. No. 16/454,722, filed Jun. 27, 2019, now U.S. Pat. No. 10,972,792, the disclosure of which is hereby incorporated by reference herein in their entireties.

BACKGROUND

The present disclosure is directed to media player clients, and more particularly to media player clients that have content filtering capabilities.

SUMMARY

When people watch movies, they often recognize certain reoccurring scene sequences and guess future scenes accordingly. For example, after watching multiple horror movies, a person may identify a common scene sequence in which a character is being stalked by a monster, the character enters a dark environment, and then a jump scare occurs. It is possible that the person does not like jump scares and tends to skip through jump scare scenes. Because the person has recognized a reoccurring scene sequence across multiple horror movies, the person may request a preemptive scene change upon viewing a scene in which a character enters a dark environment. As each movie is different, however, the subsequent scene may not be a jump scare, and therefore a preemptive scene change will prevent the person from viewing a potentially important scene.

This issue also exists in the context of manual parental controls. For example, a parent may be viewing a romantic comedy TV show with his/her child. Based on his experience with romantic comedies, the parent recognizes a scene sequence in which a character takes another character on a date, both characters return to a house, and an intimate scene begins. To prevent the child from viewing the potential intimate scene, the parent may fast-forward by one minute at the scene where the characters arrive at the house. If in the particular TV show being watched by the parent and his/her child, the characters return to the house and an intimate scene does not take place, the parent may have unknowingly skipped an important non-intimate scene. To prevent this from happening, the parent should be informed that the scene does not need to be changed.

Systems and methods for analyzing a scene and indicating whether a scene should be changed are thus described herein. In at least one embodiment, a media player client identifies, in a viewing history of a user, a first media asset for which a scene change request was received during playback. The media player client identifies a first scene in the first media asset where the scene change request was received and determines a first sequence of scenes preceding the first scene. The media player client subsequently monitors an output of a second media asset for a second sequence of scenes that corresponds to the first sequence of scenes. The user is anticipated to request a scene change upon viewing a similar sequence of scenes that previously culminated in a scene that the user chose to change. In response to detecting the second sequence of scenes that corresponds to the first sequence of scenes, the media player client compares the first scene (the scene that was previously skipped) with an upcoming scene in the second media asset. The media player client determines, based on the comparing, that the first scene does not correspond to the upcoming scene and outputs an indication that the first scene does not correspond to the upcoming scene. For example, if the first scene is a jump scare, the media player client will indicate that the upcoming scene is not a jump scare.

When monitoring the second media asset for the second sequence of scenes that corresponds to the first sequence of scenes, the media player client may rely on metadata for scene comparisons. In some embodiments, the media player client determines, based on metadata of the first media asset, a first plurality of categories for the first sequence of scenes. Likewise, the media player client determines, based on metadata of the second media asset, a second plurality of categories for the second sequence of scenes. Each scene of the respective sequence of scenes is assigned a category from the respective plurality of categories, and the number of scenes to include in each of the first sequence of scenes and the second sequence of scenes may be retrieved by the media player client from a user profile. The media client player then compares the first plurality of categories with the second plurality of categories to determine whether the second sequence of scenes corresponds to the first sequence of scenes.

This determination can be carried out in various ways. For example, the media player client may determine whether a majority of categories in the second plurality of categories match the first plurality of categories. The media player client may also determine whether an order of categories in the second plurality of categories matches an order of categories in the first plurality of categories.

In response to determining that the first sequence of scenes matches a second sequence of scenes, the media player client compares the first scene from the first media asset and the upcoming scene from the second media asset. Specifically, the media player client determines, based on metadata of the first media asset, a first category for the first scene, and, based on metadata of the second media asset, a second category for the second scene. The media player client then compares the first category with the second category to determine whether the respective scenes correspond.

If the respective scenes do correspond, then the media player client may output an indication that a scene change is recommended. Otherwise, in some embodiments, the media player client may generate for display an indication that the scene change at the upcoming scene is not recommended. The media player client may output these indications at a device different from the device on which the second media asset is being output.

The media player client may also monitor for a scene change request before outputting any indications. In response to receiving a scene change request prior to the upcoming scene, the media player client may not execute the request for the scene change and may instead output the indication.

In at least one embodiment, the media player client may not actively monitor for a sequence of scenes to provide indications on whether a scene change is recommended. Instead, the media player client may evaluate whether to execute a scene change request. The media player client may receive, during an output of a media asset, a scene change request prior to an upcoming scene of the media asset. In response to receiving the scene change request, the media player client determines a sequence of scenes preceding the upcoming scene. The media player client identifies a first media asset in a viewing history and identifies a first scene in the first media asset at which a request for a scene change was received. The media player client subsequently determines a first sequence of scenes preceding the first scene. In response to determining that the first sequence of scenes corresponds to the sequence of scenes in the media asset currently being output, the media player client compares the first scene with the upcoming scene. In response to determining that the first scene does not correspond to the upcoming scene, the media player client does not execute the scene change request.

In some embodiments, the analysis of scene sequences is performed in response to receiving a scene change request. This scene change request may be, for example, a fast-forwarding request. In some embodiments, subsequent to not executing the scene change request, the media player client may execute a modified scene change request. In terms of the scene change request being a fast-forwarding request, the media player client may determine a number of frames skipped in a period of time and modify the fast-forwarding request by reducing the number of frames skipped in the period of time. The media player client may then execute the modified fast-forwarding request.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
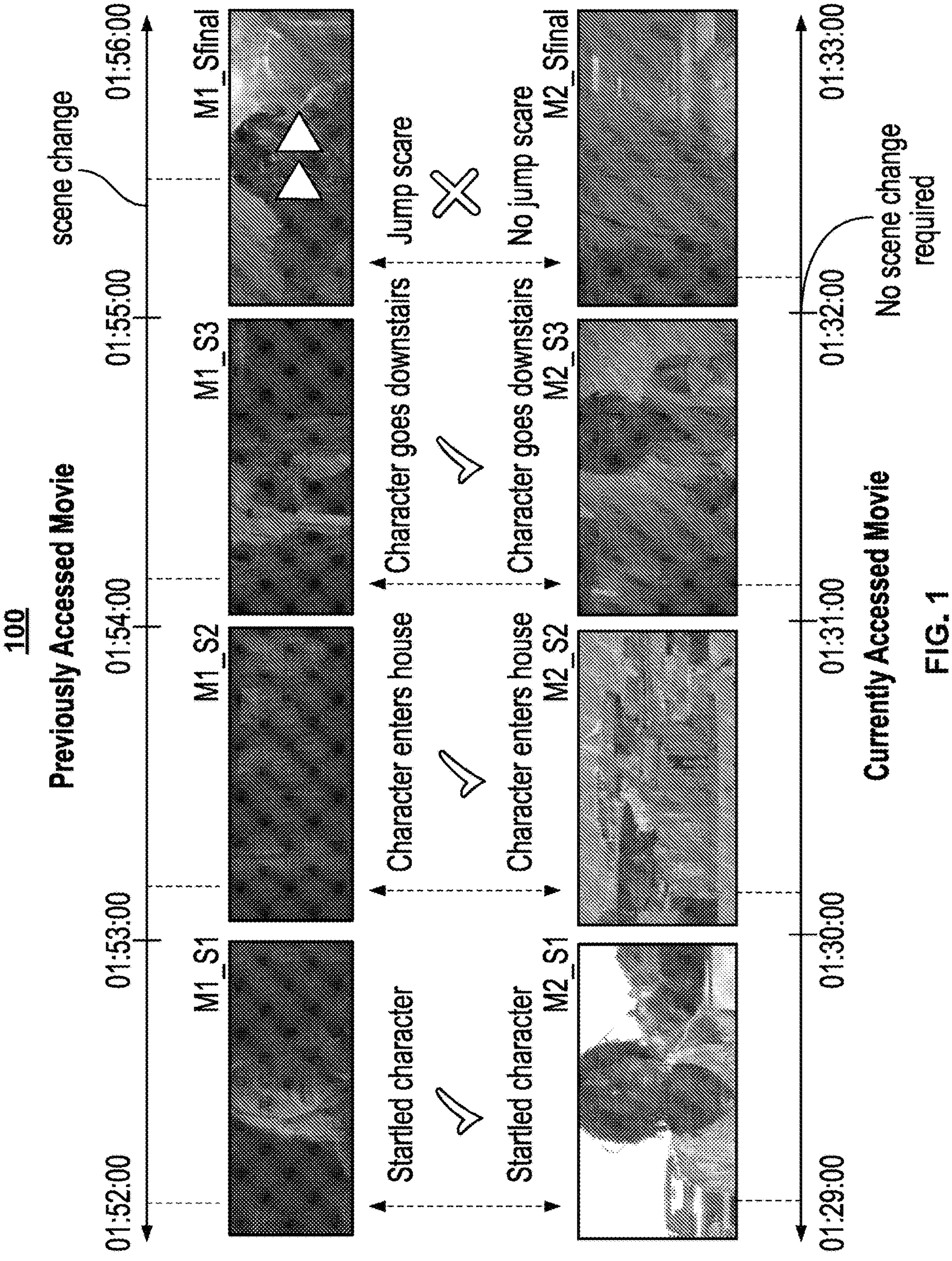
FIG. 1 shows an illustrative example of comparing scene sequences to determine whether a scene change is needed, in accordance with some embodiments of the disclosure.

FIG. 1 shows illustrative example 100 of comparing scene sequences to determine whether a scene change is needed, in accordance with some embodiments of the disclosure. In example 100, the playback trackers of two movies are shown. The first movie, "A Quiet Place," is a previously accessed movie and the second movie, "Us," is now being accessed. For "A Quiet Place," the playback window between the 1-hour 52-minute mark and the 1-hour and 56-minute mark is shown with 1-minute intervals. For "Us," the playback window between the 1-hour 29-minute mark and the 1-hour 33-minute mark is shown with 1-minute intervals. The scenes from different parts of the respective movies are depicted. Each scene is represented by an image labeled "M[x]_S[y]" where "x" indicates the movie number and "y" indicates the scene number.

In order to learn the user's scene-changing tendencies, the media player client retrieves the viewing history of the user for scene changing data. This viewing history may be linked to a user profile on a service. For example, streaming applications such as YouTube™ keep track of a user's viewing history across multiple devices in which the user is logged onto his/her YouTube account. The media player client subsequently identifies a scene in a media asset listed in the viewing history, the scene being one at which the user previously requested a scene change. A scene change is an action that prevents the output of a scene. Scene changes may include scene skipping, fast-forwarding, channel switching, application switching, closing the media asset within an application or media asset switching. The media player client may further store, in a user profile, all scene change requests along with their corresponding scene identifiers (e.g., scene numbers) and movie identifiers (e.g., movie titles). In example 100, a scene change request is received by the media player client at M1_Sfinal between the 1-hour 55-minute mark and the 1-hour 56-minute mark. The media player client may record this scene change request in a data structure linked to the user profile as an entry<fast-forwarding request, "A Quiet Place," "scene 4">. In some embodiments, the media player client refers directly to this data structure to identify the media asset and the scene in the media asset at which a scene change request was previously received.

The media player client then determines a sequence of scenes preceding the identified scene. In example 100, the media player client retrieves metadata associated with the media asset. The metadata may label the different scenes in the media asset based on their start and end times (e.g., M1_S1 begins at the 1-hour 52-minute mark and ends at the 1-hour 53-minute mark). For simplicity, in example 100, each scene has a 1-minute duration. Based on the metadata, the media player client identifies three scenes preceding the scene at which a scene change was requested. The number of scenes to include in a scene sequence may be predetermined (e.g., a default value of 3 as assigned by the developers of the media player client) and may be increased/decreased by the user. In some embodiments, the media player client requests a sequence size value from the user during first-time use of the media player client. The media player client stores the received value in a user profile.

The metadata may also provide categories (used interchangeably with "descriptive labels") for each scene. In example 100, the metadata of "A Quiet Place" indicates descriptive labels "startled character," "character enters house," "character goes downstairs," and "jump scare" for M1_S1, M1_S2, M1_S3, and M1_Sfinal respectively. The media player client stores these descriptive labels in the data structure with the scene change request information. An example entry in the data structure is shown below:

| Media Asset | Request | Scene 1 | Scene 2 | Scene 3 | Scene Final |
|---|---|---|---|---|---|
| A Quiet Place | Fast-forward | startled character | character enters house | character goes downstairs | jump scare |

Whenever the media player client receives a scene change request, the media player client may add an entry to this data structure with scene sequence categories and the type of scene change request.

Subsequent to viewing the media asset "A Quiet Place," the user may view the media asset "Us." The user has a tendency to skip jump scare scenes and the user anticipates these jump scares based on the appearance of a sequence of scenes "startled character," "character enters house," and "character goes downstairs." Because the user has seen this sequence in "A Quiet Place," the user is likely to request a scene change when a similar sequence occurs in a different media asset. Accordingly, the media player client monitors the media assets the user views to detect the sequence and determine whether or not the user should change the scene. The media player client may perform this monitoring in real time. For example, if "Us" is being accessed on a live television channel, the media player client may monitor the scene sequences in "Us" while the media asset is being output. In some embodiments, the media player client performs the monitoring before the sequence of scenes has occurred. For example, the media asset "Us" may be on a watchlist linked to the user profile. The media player client determines that the user will watch "Us," and begins scanning the movie for the sequence of scenes listed in the data structure.

In example 100, the media player client retrieves the metadata of "Us" and determines that the sequence "startled character," "character enters house," and "character goes downstairs," occurs in between the 1-hour 29-minute mark and the 1-hour 32-minute mark. In a more technical description of this process of detecting the sequence, the media player client may scan the categories in the metadata of "Us" for the category "startled character" (the first category in the sequence recorded in the data structure). In response to detecting the category in the categories of "Us," the media player client determines whether the category of the subsequent scene in "Us" is "character enters house." In response to determining that the category of the subsequent scene in "Us" is "character enters house," the media player client determines whether the category of the subsequent scene is "character goes downstairs." In response to detecting that all categories in the recorded sequence from "A Quiet Place" match the categories in a sequence of "Us," the media player client determines that the scene following the scene sequence in "Us" is a candidate for a scene change.

The media player client may alternatively determine that two sequences correspond to each other if a majority of the scenes in the sequence have similar or matching categories. For example, the media player client compares the categories of the recorded sequence in the data structure with three categories of consecutive scenes in "Us." Suppose that the category of M2_S2 is "character runs," instead of "character enters house." By comparing scenes three at a time, the media player client will determine that the categories of M1_S1, M1_S3 and M2_S1, M2_S3 match, respectively, whereas the categories of M1_S2 and M2_S2 are different. Because the media player client is able to detect two matches out of a possible three (i.e., a majority match), the media player client determines that the two sequences correspond to each other.

As different content providers may label scenes differently in the metadata (e.g., instead of "startled character," the content provider may label the scene as "scared character"), the media player client applies a fuzzy matching logic when comparing the categories. For example, the media player client determines the synonyms of terms used in the categories and also identifies interchangeable phrases and names that would not alter the meaning of a sentence. If the sequence in "Us" is labelled as "afraid heroine," "heroine goes inside house" and "heroine goes downstairs," the media player client may still determine a match between the sequence categories because "heroine" and "character" are interchangeable, "startled" and "afraid" are synonyms, and "goes inside" and "enters" are interchangeable.

In some embodiments, the content provider may not provide metadata for a media asset. In such cases, the media player client determines that no metadata is retrievable and automatically categorizes each scene itself. For example, the media player client may determine a period of time to allocate to each scene (e.g., 1-minute intervals). The media player client scans the frames of a 1-minute scene and identifies a prominent frame. The prominent frame represents a frame that depicts an image appearing in a majority of the frames within the 1-minute scene. In example 100, these prominent frames are depicted. Considering M2_S1, for example, the prominent frame is a character close-up. Subsequent to identifying the prominent frame, the media player client assigns a category to the scene by using image processing to determine descriptive labels for the prominent scene (e.g., using image classification to output the descriptive label "scared girl."). The descriptive label "scared girl" thus becomes the category for M2_S1 and the media player client proceeds to categorize the remaining scenes in the media asset.

In response to determining that the recorded sequence (M1_S1, M1_S2, M1_S3) from "A Quiet Place" corresponds to the sequence (M2_S1, M2_S2, M2_S3) from "Us," the media player client compares the culminating scenes, namely, M1_Sfinal and M2_Sfinal. The media player client may, for example, compare the categories of the respective scenes (as determined via metadata or image classification). In example 100, the media player client determines that the categories "jump scare" and "no jump scare" do not correspond. It is also possible that the category of M2_Sfinal can be something different altogether such as "character enters hallway." Because the categories still do not correspond, the media player client determines that the scenes do not correspond either. This implies that what caused the user to previously fast-forward through M2_Sfinal (e.g., the jump scare) is not in M2_Sfinal. Even if the user is inclined to request a scene change, the scene change is not needed, because the jump scare that the user is trying to avoid is not in the upcoming scene in "Us." The media player client accordingly outputs an indication that the scenes do not match. In the event that the media player client determines that the scenes do not match before the user begins watching "Us" or before playback arrives at M2_Sfinal, the media player client schedules an output of the indication. The media player client may, for example, schedule the output at the 1-hr 32-minute mark. The output of the indication may be displayed, delivered via audio, or a combination thereof.

Because the data structure with scene sequences and scene change requests may grow quite large in size, the media player client may employ a classification-based machine learning algorithm for anticipating whether the user will want to request a scene change. For example, the media player client may utilize the data structure entries as a training and testing dataset. The training/testing datasets further include entries of sequences where a scene change was not requested. The input to the algorithm is a sequence of scenes including the culminating scene at which a scene change was requested (e.g., M1_S1 to M1_Sfinal). The output is an indication of whether a scene change is recommended. The media player client thereby trains a binary classifier using, for example, gradient descent to recognize the sequences that motivate a user to request a scene change. Subsequent to training the binary classifier, the media player client provides new sequences (e.g., scenes M2_S1 to M2_Sfinal from "Us") to the binary classifier and receives an indication recommending or not recommending a scene change.

Figure 2:
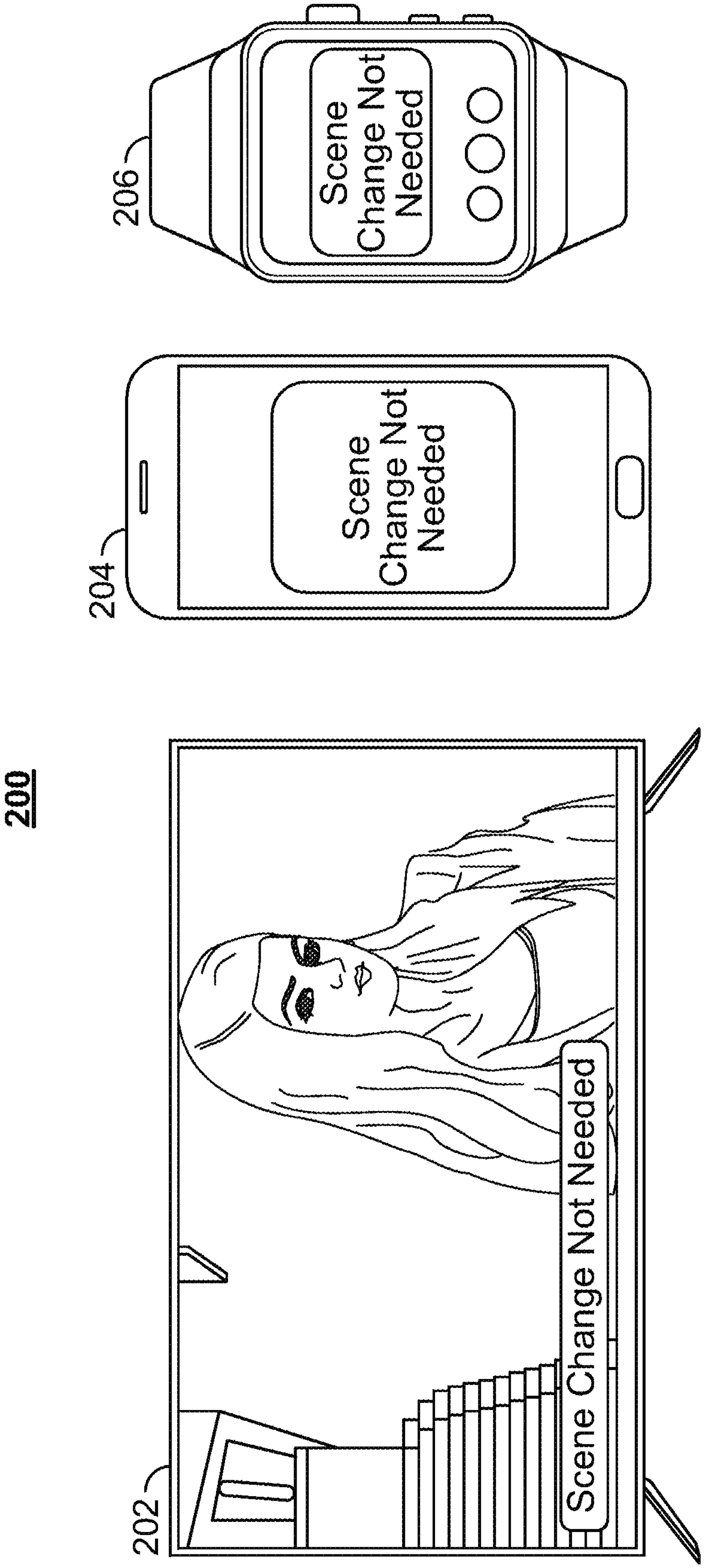
FIG. 2 shows an illustrative example of a warning indicating that a scene change is not needed, in accordance with some embodiments of the disclosure.

FIG. 2 shows illustrative example 200 of a warning indicating that a scene change is not needed, in accordance with some embodiments of the disclosure. Suppose that the user is viewing "Us" on smart television 202. The media player client may generate for display a textbox stating "scene change not needed" on a portion of the frame prior to M2_Sfinal. In some embodiments, the media player client generates this indication on a different device (e.g., at least one of smartphone 204 and smartwatch 206). The media player client detects a different device linked to the user profile of the user. For example, the user may be casting the output of the media asset from smartphone 204 to smart television 202. Rather than generating the output of the indication on smart television 202, the media player client generates the output on smartphone 204. If smartwatch 206 is linked with smartphone 204, the media player client may additionally or alternatively output the indication on smartwatch 206. The media player client may specifically schedule the output prior to M2_Sfinal's playback (e.g., a set period of time such as 10 seconds before the first frame of the scene is output).

Figure 3:
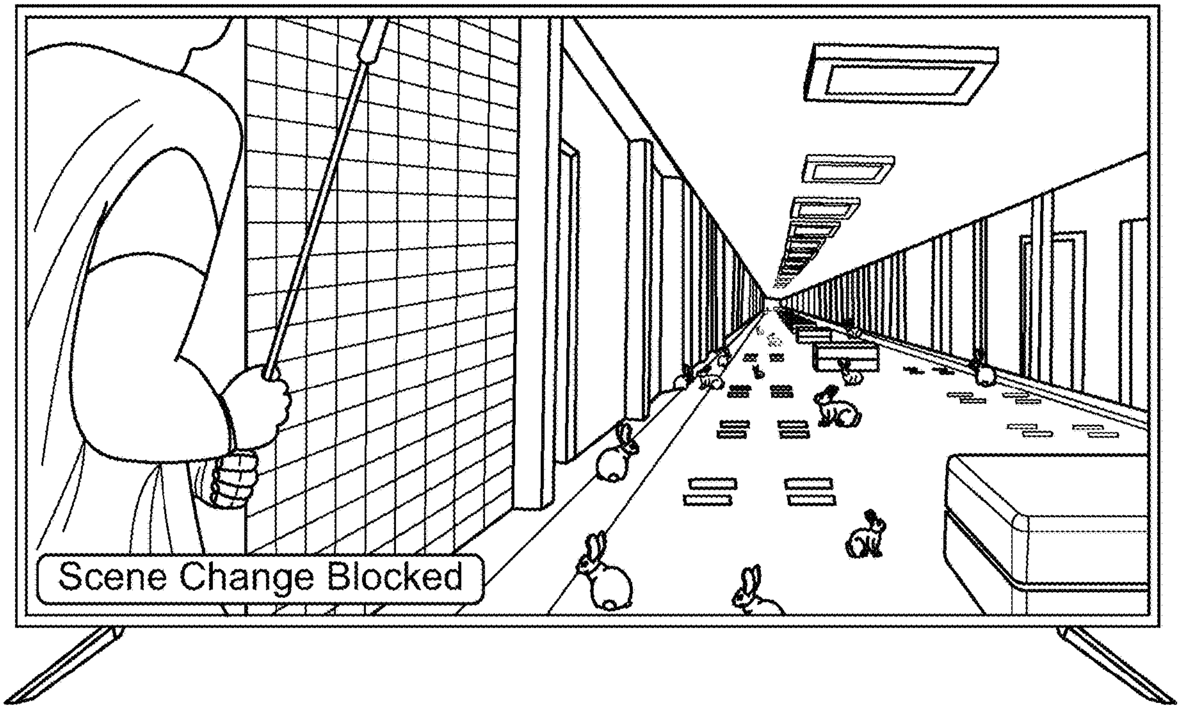
FIG. 3 shows an illustrative example of not executing a scene change request, in accordance with some embodiments of the disclosure.

FIG. 3 shows illustrative example 300 of not executing a scene change request, in accordance with some embodiments of the disclosure. In some embodiments, the media player client receives a scene change request at M2_S3. Because the media player client has already determined that the scene does not need to be changed, the media player client does not execute the received change request. Instead, the media player client may output a textbox stating "scene change not needed" or "scene change blocked" as depicted in example 300.

In one embodiment, the media player client does not actively monitor for a sequence of scenes to provide indications on whether a scene change is recommended. Instead, the media player client may evaluate whether to execute a scene change request. The media player client receives, during an output of a media asset (e.g., "Us"), a scene change request prior to an upcoming scene of the media asset. For example, the media player client may receive a scene change request during M2_S3 (with the upcoming scene being M2_Sfinal). In response to receiving the scene change request, the media player client determines a sequence of scenes preceding the upcoming scene (e.g., M2_S1 to M2_S3).

The media player client identifies a previously viewed media asset in the user's viewing history, such as "A Quiet Place," and identifies a first scene (e.g., M1_Sfinal) in first media asset at which a request for a scene change was received. The media player client subsequently determines a first sequence of scenes preceding the first scene. In some embodiments, the media player client performs this determination and the identification of the first scene by referring to the data structure listing scene sequences and scene change requests. In response to determining that the first sequence of scenes corresponds to the sequence of scenes in the media asset currently being output (e.g., M1_S1 to M1_S3 correspond to M2_S1 to M2_S3), the media player client compares the first scene (e.g., M1_Sfinal) with the upcoming scene (e.g., M2_Sfinal). In response to determining that the first scene does not correspond to the upcoming scene, the media player client does not execute the scene change request. As depicted in example 300, the media player client may instead output an indication that the scene change request has been blocked or is not needed.

Figure 4:
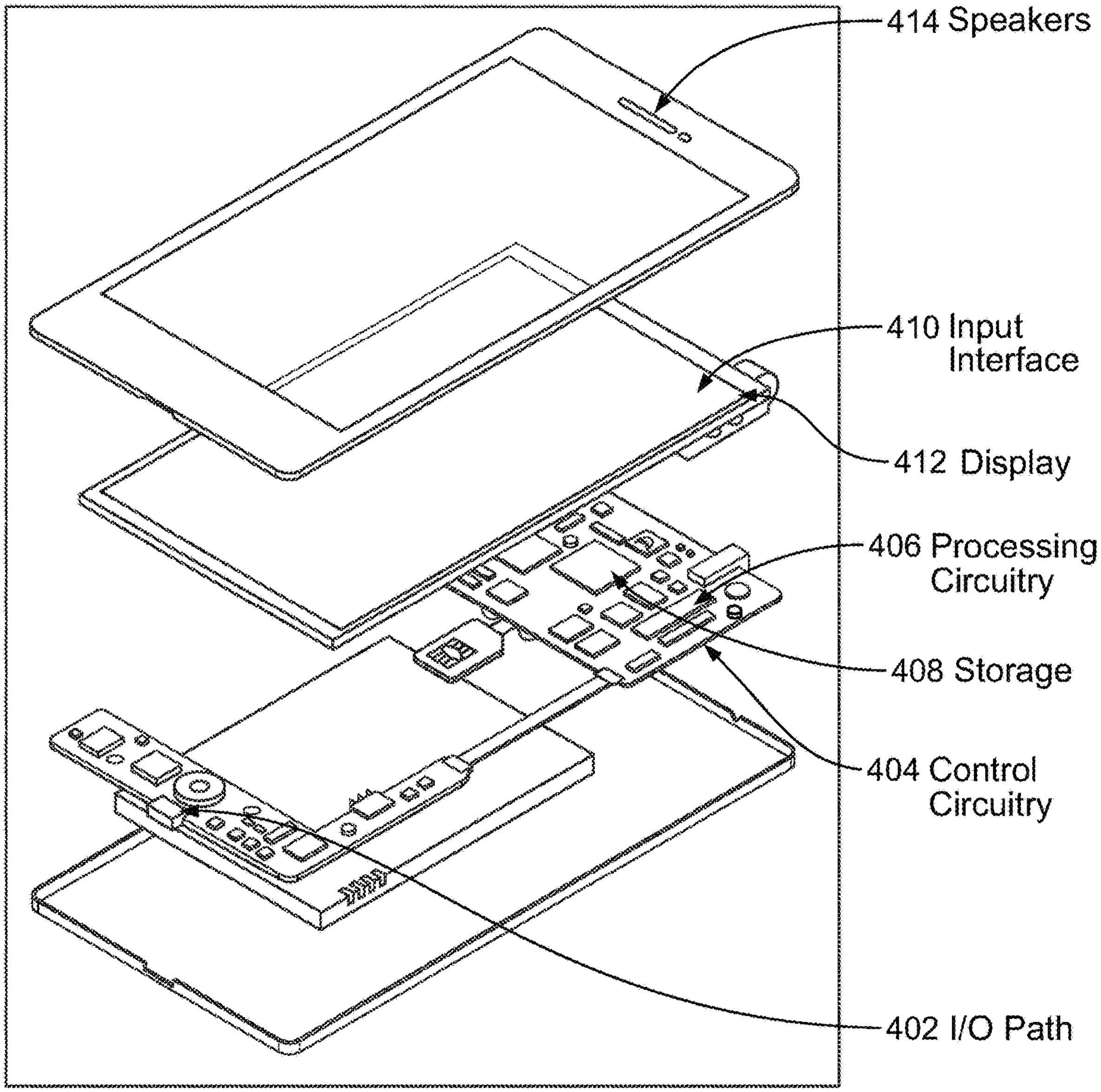
FIG. 4 is a diagram of an illustrative media device, in accordance with some embodiments of the disclosure.

FIG. 4 shows a generalized embodiment of illustrative device 400. As depicted in FIG. 4, device 400 is a smartphone. However, device 400 is not limited to smartphones and may be any computing device. For example, device 400 of FIG. 4 can be implemented in system 500 of FIG. 5 as device 502 (e.g., a smartphone, a smart television, a computer, or any combination thereof).

Device 400 may receive data via input/output (hereinafter I/O) path 402. I/O path 402 may provide received data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communication paths (described below). I/O functions may be provided by one or more of these communication paths but the paths are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media player client stored in memory (i.e., storage 408).

A media player client may be a stand-alone application implemented on a device or a server. The media player client may be implemented as software or a set of executable instructions. The instructions for performing any of the embodiments discussed herein of the media player client may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, in FIG. 4 the instructions may be stored in storage 408 and executed by control circuitry 404 of a device 400.

In some embodiments, a media player client may be a client-server application where only the client application resides on device 400 (e.g., device 502), and a server application resides on an external server (e.g., server 506). For example, a media player client may be implemented partially as a client application on control circuitry 404 of device 400 and partially on server 506 as a server application running on control circuitry. Server 506 may be a part of a local area network with device 502 or may be part of a cloud computing environment accessed via the Internet. In a cloud computing environment, various types of computing services for performing searches on the Internet or informational databases, providing storage (e.g., for scene change requests and scene sequences) or parsing data are provided by a collection of network-accessible computing and storage resources (e.g., server 506), referred to as the cloud. Device 400 may be a cloud client that relies on the cloud computing capabilities from server 506 to compare scene sequences and individual scenes. When executed by control circuitry of server 506, the media player client may instruct the control circuitry to generate the media player client output (e.g., the indication that the first scene and the second scene correspond to each other) and execute/not execute a scene change request received at device 502. The client application may instruct control circuitry of the receiving device 502 to generate the media player client output. Alternatively, device 502 may perform all computations locally via control circuitry 404 without relying on server 506.

Control circuitry 404 may include communications circuitry suitable for communicating with a media player client server or other networks or servers. The instructions for carrying out the above-mentioned functionality may be stored and executed on server 506. Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communication network or paths. In addition, communications circuitry may include circuitry that enables peer-to-peer communication of devices, or communication of devices in locations remote from each other.

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, or any other suitable fixed or removable storage devices, and/or any combination of the same. Nonvolatile memory may also be used (e.g., to launch a boot-up routine and other instructions). Cloud-based storage (e.g., on server 506) may be used to supplement storage 408 or instead of storage 408.

A user may send instructions to control circuitry 404 using user input interface 410 of device 400. User input interface 410 may be any suitable user interface touchscreen, touchpad, or stylus and may be responsive to external device add-ons such as a remote control, mouse, trackball, keypad, keyboard, joystick, voice recognition interface, or other user input interfaces. Display 410 (also referred to as display circuitry) may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 412. Speakers 414 may be provided as integrated with other elements of user equipment device 400 or may be standalone units. An audio component of the indication that scenes correspond, and other content displayed on display 412, may be played through speakers 414. In some embodiments, the audio may be distributed to a receiver (not shown), which processes and outputs the audio via speakers 414.

Control circuitry 404 may allow a user to provide user profile information or may automatically compile user profile information. For example, control circuitry 404 may monitor user requests for scene changes and the media assets associated with the requests. Control circuitry 404 may store the scene change requests in a viewing history database linked to the user profile. Additionally, control circuitry 404 may obtain all or part of other user profiles that are related to a particular user (e.g., via social media networks), and/or obtain information about the user from other sources that control circuitry 404 may access. As a result, a user can be provided with a unified experience across the user's different devices.

Figure 5:
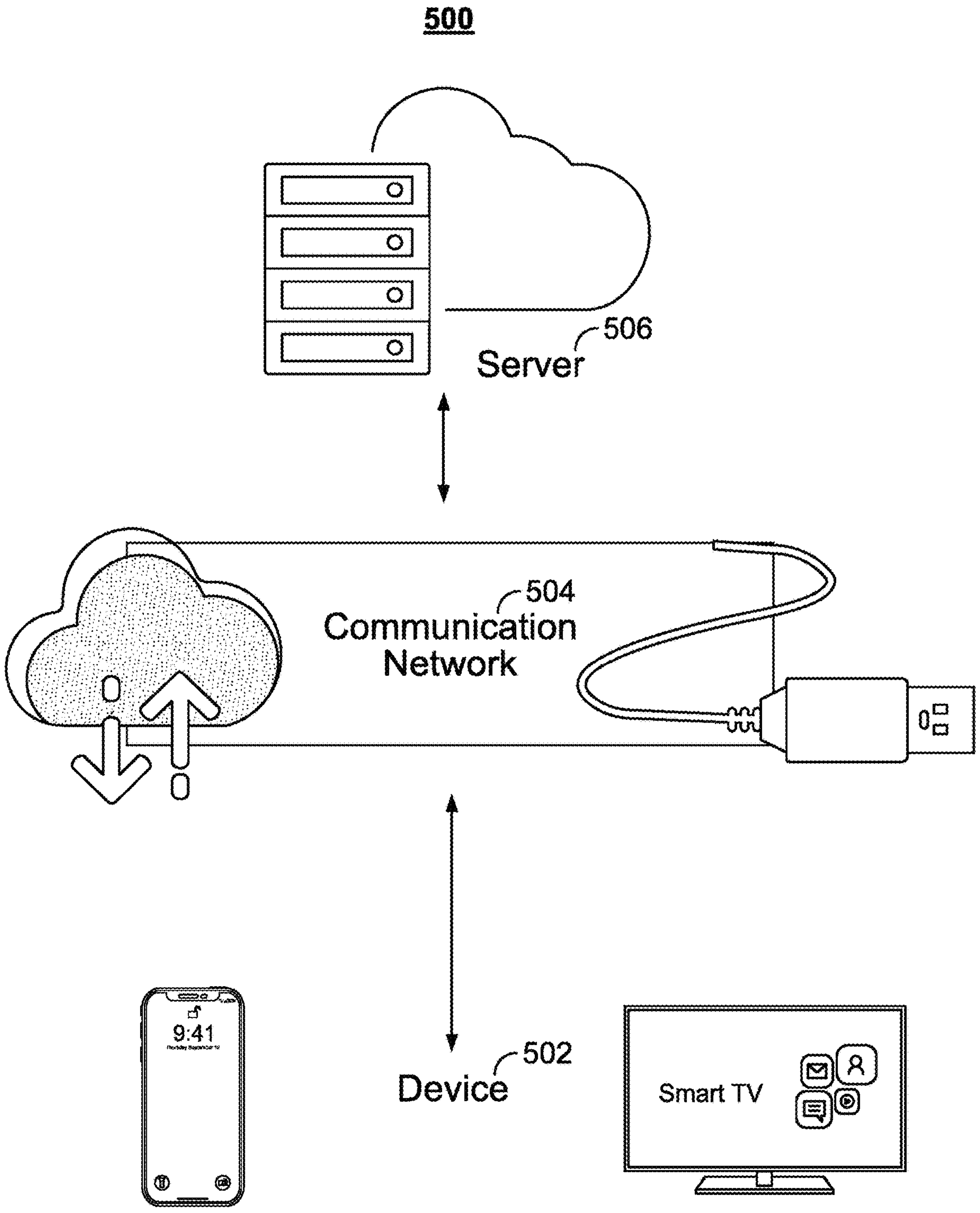
FIG. 5 is a diagram of an illustrative media system, in accordance with some embodiments of the disclosure.

As depicted in FIG. 5, device 502 may be coupled to communication network 504. Communication network 504 may be one or more networks including the Internet, a mobile phone network, mobile voice or data network (e.g., a 4G or LTE network), cable network, public switched telephone network, Bluetooth, or other type of communication network or combinations of communication networks. Thus, device 502 may communicate with server 506 over communication network 504 via communications circuitry described above. It should be noted that there may be more than one server 506, but only one is shown in FIG. 5 to avoid overcomplicating the drawing. The arrows connecting the respective device(s) and server(s) represent communication paths, which may include a satellite path, a fiber-optic path, a cable path, a path that supports Internet communications (e.g., IPTV), a free-space connection (e.g., for broadcast or other wireless signals), or any other suitable wired or wireless communication path or combination of such paths.

Figure 6:
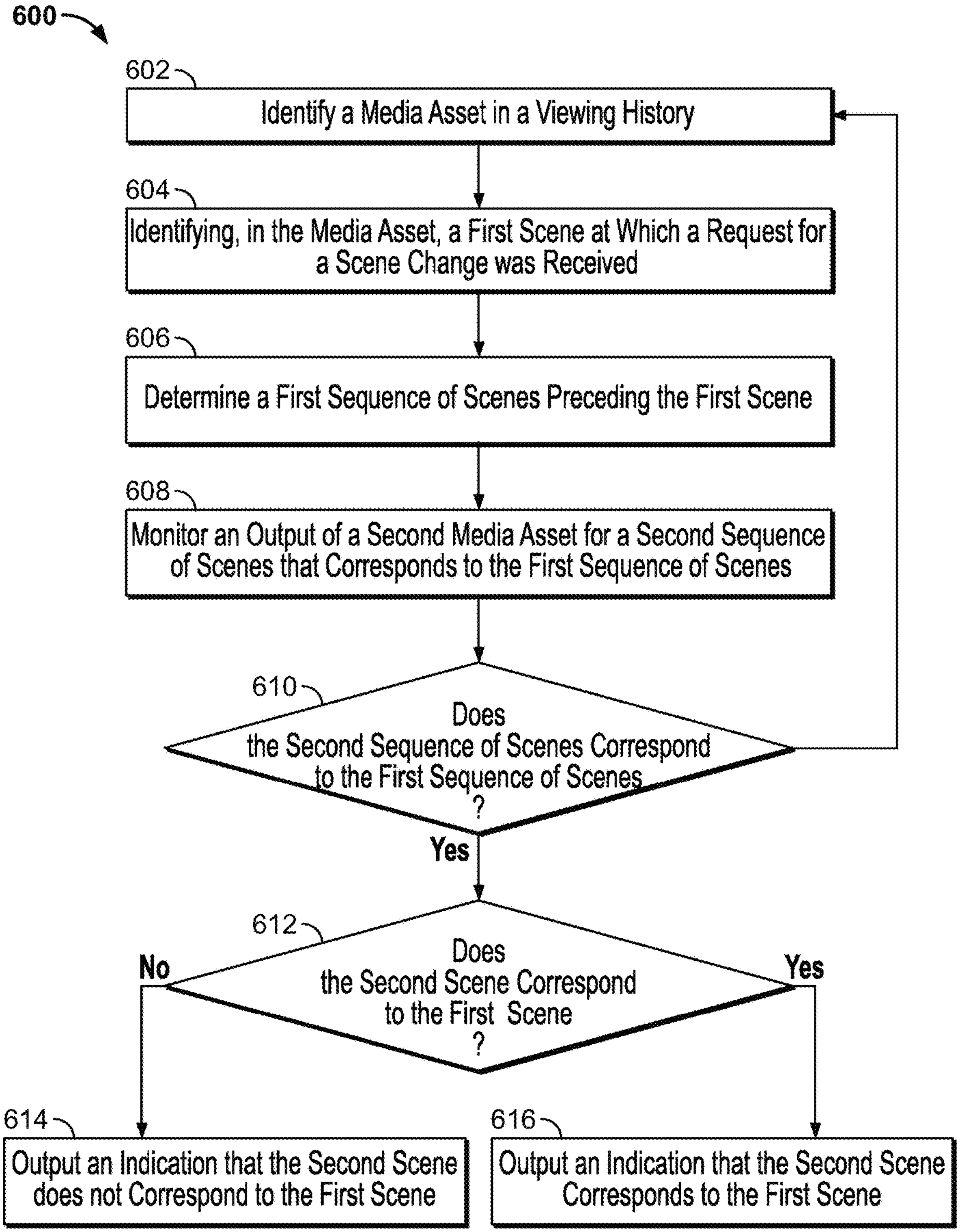
FIG. 6 is a flowchart of an illustrative process for outputting an indication that a second scene does not correspond to a first scene, in accordance with some embodiments of the disclosure.

FIG. 6 is a flowchart of illustrative process 600 for outputting an indication that a second scene does not correspond to a first scene, in accordance with some embodiments of the disclosure. Process 600 may be performed by control circuitry 404 of device 502 and/or server 506. At 602, control circuitry 404 identifies a media asset in a viewing history stored in storage 408 of device 502 or server 506. For example, the media asset may be the movie "A Quiet Place," as shown in example 100. At 604, control circuitry 404 identifies, in the media asset, a first scene at which a request for a scene change was received. Referring to example 100, the first scene is M1_Sfinal. At 606, control circuitry 404 determines a first sequence of scenes (e.g., M1_S1 to M1_S3) preceding the first scene.

At 608, control circuitry 404 monitors an output of a second media asset for a second sequence of scenes that corresponds to the first sequence of scenes. For example, the user may be viewing the movie "Us" on device 502. Control circuitry 404 scans the scenes of "Us" for a sequence of scenes that corresponds to the sequence of scenes determined in "A Quiet Place" (i.e., M2_S1 to M2_S3). At 610, control circuitry 404 determines whether the second sequence of scenes corresponds to the first sequence of scenes. In response to determining that the second sequence of scenes does not correspond to the first sequence of scenes, process 600 returns to 602, where control circuitry 404 identifies a different media asset in the viewing history. For example, the viewing history may include multiple movies of the horror genre and control circuitry 404 selects a different movie in which a scene change request was previously received.

Alternatively, in response to determining that the second sequence of scenes corresponds to the first sequence of scenes, at 612, control circuitry 404 determines whether the second scene (e.g., M2_Sfinal) corresponds to the first scene (e.g., M1_Sfinal). In response to determining that the second scene does not correspond to the first scene, at 614, control circuitry 404 outputs an indication that the second scene does not correspond to the first scene. Otherwise, at 616, control circuitry 404 outputs an indication that the second scene corresponds to the first scene.

Figure 7:
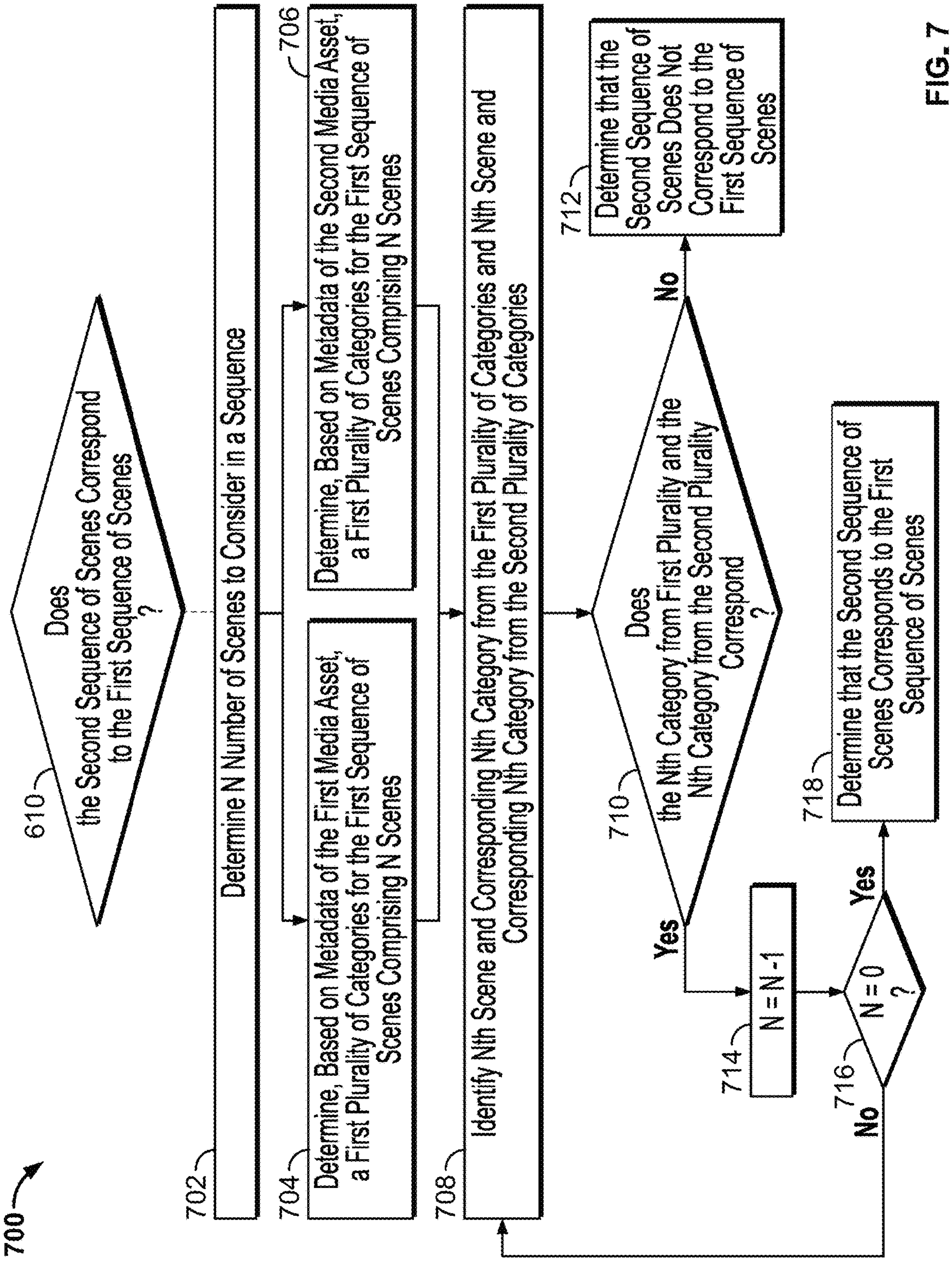
FIG. 7 is a flowchart of an illustrative process for determining that the second sequence of scenes corresponds to the first sequence of scenes based on an order of the scenes, in accordance with some embodiments of the disclosure.

FIG. 7 is a flowchart of illustrative process 700 for determining that the second sequence of scenes corresponds to the first sequence of scenes based an order of the scenes, in accordance with some embodiments of the disclosure. Process 700 elaborates on 610 of process 600. At 702, control circuitry 404 determines N number of scenes to consider in a sequence. For example, control circuitry 404 determines that it will consider the three consecutive scenes preceding a scene at which a scene change was requested. At 704, control circuitry 404 determines, based on metadata of the first media asset, a first plurality of categories for the first sequence of scenes comprising N scenes. Referring to example 100, the categories for M1_S1, M1_S2 and M1_S3 are "startled character," "character enters house," and "character goes downstairs," respectively. At 706, control circuitry 404 determines, based on metadata of the second media asset, a second plurality of categories for the second sequence of scenes comprising N scenes. Referring to example 100, the categories for M2_S1, M2_S2 and M2_S3 are "startled character," "character enters house," and "character goes downstairs," respectively.

At 708, control circuitry 404 identifies the Nth scene and the corresponding Nth category from the first plurality of categories and the Nth scene and the corresponding Nth category from the second plurality of categories. For example, control circuitry 404 identifies the third scene from both sequences. At 710, control circuitry 404 determines whether the Nth category from first plurality and the Nth category from the second plurality correspond. For example, control circuitry 404 compares the category of M1_S3 and M2_S3 and determines that both categories are "character goes downstairs." In response to determining that the respective categories do not correspond, at 712, control circuitry 404 ends process 700 by determining that the second sequence of scenes does not correspond to the first sequence of scenes. In contrast, if, at 710, control circuitry 404 determines that the respective categories correspond, at 714, control circuitry 404 decrements the value of N by 1. At 716, control circuitry 404 determines whether N equals 0 (e.g., all N scenes have been considered). In response to determining that N does not equal 0, process 700 returns to 708, where the new Nth scenes are considered. For example, control circuitry 404 considers the second scene from both sequences, and subsequent to determining that the respective categories of the second scenes correspond, considers the first scene from both sequences. In response to determining that N equals 0, control circuitry 404 ends process 700 at 718, where control circuitry 404 determines that the second sequence of scenes corresponds to the first sequence of scenes.

Figure 8:
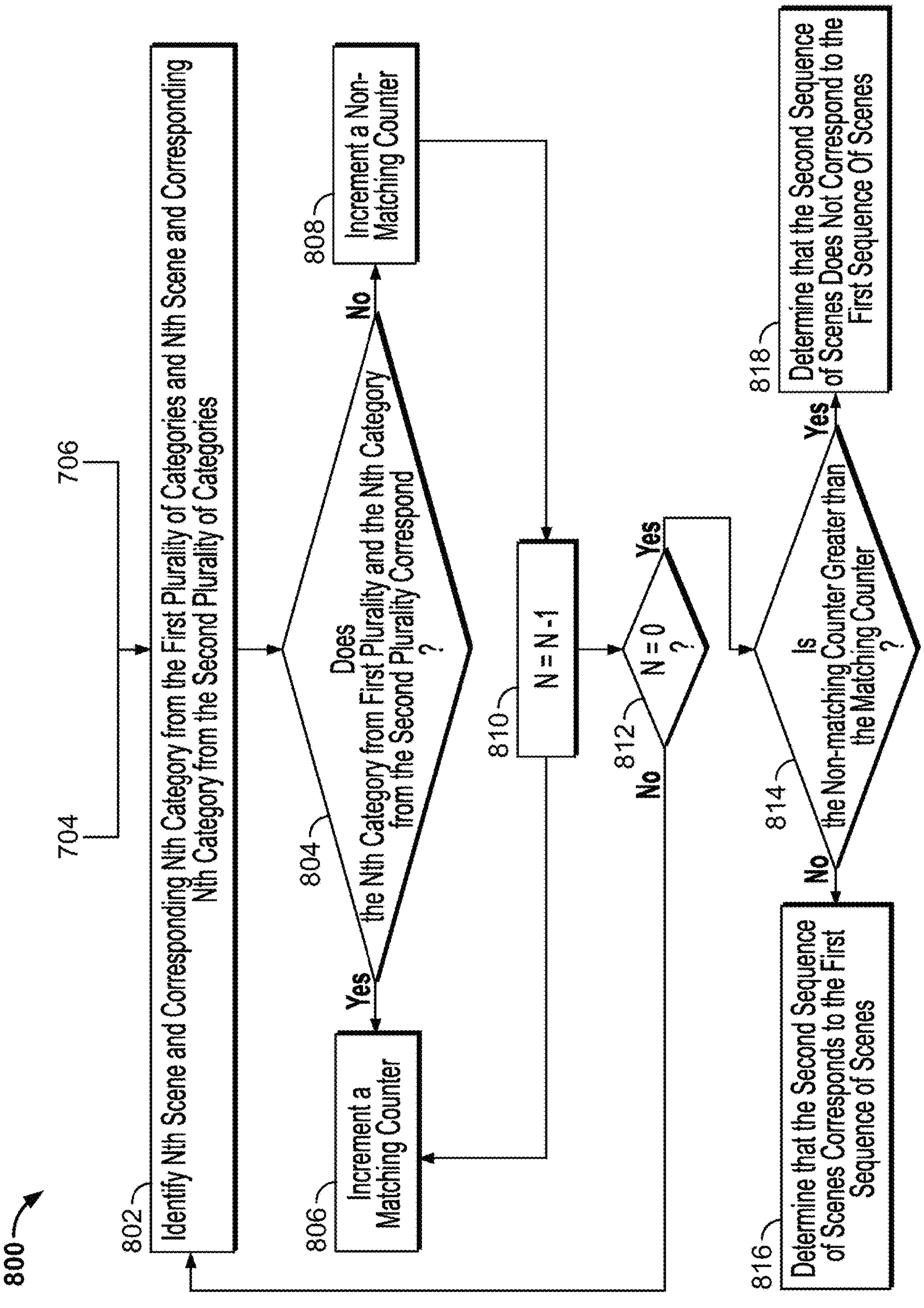
FIG. 8 is a flowchart of an illustrative process for determining that the second sequence of scenes corresponds to the first sequence of scenes based on a majority of matching scenes, in accordance with some embodiments of the disclosure.

FIG. 8 is a flowchart of illustrative process 800 for determining that the second sequence of scenes corresponds to the first sequence of scenes based a majority of matching scenes, in accordance with some embodiments of the disclosure. Process 800 starts when 704 and 706 are completed in process 700. At 802, control circuitry 404 identifies the Nth scene and the corresponding Nth category from the first plurality of categories and the Nth scene and the corresponding Nth category from the second plurality of categories. For example, control circuitry 404 considers the third scenes of the respective sequences. At 804, control circuitry 404 determines whether the Nth category from first plurality and the Nth category from the second plurality correspond. In response to determining that the Nth category from first plurality and the Nth category from the second plurality correspond, at 806, control circuitry 404 increments a matching counter. For example, in response to determining that the categories for the third scenes are both "character goes downstairs," control circuitry 404 increments a matching counter, which is initially "0," to "1."

From 806 and 808, control circuitry 404 proceeds to 810, where control circuitry 404 decrements the value of N by 1. At 812, control circuitry 404 determines whether N equals 0. In response to determining that N does not equal 0, process 800 returns to 802, where the new Nth scenes are identified. In this iteration through the loop between 802 and 812, control circuitry 404 considers the second scenes in the respective sequences. Suppose that the category of M1_S2 is "character enters house" and the category of M2_S2 is "character runs away." In response to determining that the Nth category from the first plurality and the Nth category from the second plurality do not correspond, at 808, control circuitry 404 increments a non-matching counter (e.g., from "0" to "1"). In another iteration through the loop, control circuitry 404 considers the first scenes of the respective sequences and in response to determining that the scenes correspond, control circuitry 404 increments the matching counter (e.g., from "1" to "2").

At 812, if control circuitry 404 determines that N equals 0 (indicating that no other scenes are left to consider in the respective sequences), at 814, control circuitry 404 determines whether the nonmatching counter is greater than the matching counter. In response to determining that the nonmatching counter is greater than the matching counter, at 818, control circuitry 404 determines that the second sequence of scenes does not correspond to the first sequence of scenes. Otherwise, in response to determining that the nonmatching counter is not greater than the matching counter, at 816, control circuitry 404 determines that the second sequence of scenes corresponds to the first sequence of scenes. In the overarching example provided, because the matching counter is at "2" and the non-matching counter is at "0," control circuitry 404 determines that the respective sequences correspond to each other.

Figure 9:
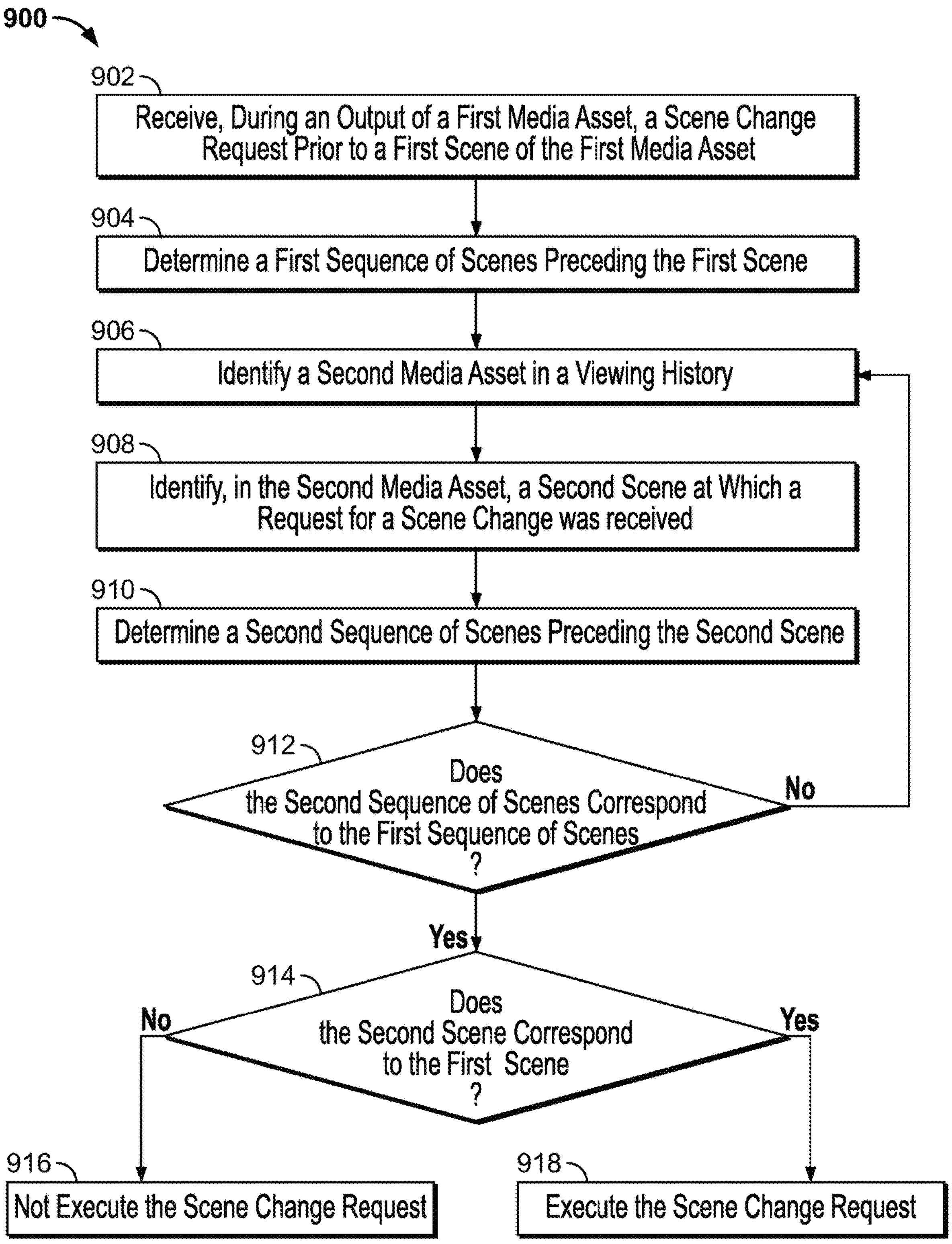
FIG. 9 is a flowchart of an illustrative process for not executing a scene change request based on corresponding scene sequences culminating in non-corresponding scenes, in accordance with some embodiments of the disclosure.

FIG. 9 is a flowchart of illustrative process 900 for not executing a scene change request based on corresponding scene sequences culminating in non-corresponding scenes, in accordance with some embodiments of the disclosure. At 902, control circuitry 404 receives, during an output of a first media asset, a scene change request prior to a first scene of the first media asset. For example, while viewing the movie "Us" a user may attempt to fast-forward past M2_Sfinal. The fast-forwarding request may specifically be initiated prior to playback of M2_Sfinal (e.g., during playback of M2_S3). At 904, control circuitry 404 determines a first sequence of scenes preceding the first scene (e.g., M2_S1, M2_S2, M2_S3). At 906, control circuitry 404 identifies a second media asset in a viewing history in storage 408 (e.g., "A Quiet Place").

At 908, control circuitry 404 identifies, in the second media asset, a second scene at which a request for a scene change was received (e.g., M1_Sfinal). At 910, control circuitry 404 determines a second sequence of scenes preceding the second scene (e.g., M1_S1 to M1_S3). At 912, control circuitry 404 determines whether the second sequence of scenes corresponds to the first sequence of scenes. In response to determining that the respective sequences do not correspond, process 900 returns to 906 where a different media asset is identified from the viewing history. In response to determining that the respective sequences do correspond, at 914, control circuitry 404 determines whether the second scene corresponds to the first scene (e.g., whether M1_Sfinal corresponds to M2_Sfinal). In response to determining that the second scene corresponds to the first scene, at 918, control circuitry 404 executes the scene change request (e.g., fast-forwards through M2_Sfinal). Otherwise, at 916, control circuitry 404 does not execute the scene change request. In some embodiments, subsequent to 916, control circuitry 404 outputs an indication (e.g., via display 412 and/or speakers 414) that a scene change is not recommended.

It should be noted that processes 600-900 or any step thereof could be performed on, or provided by, any of the devices shown in FIGS. 4-5. For example, the processes may be executed by control circuitry 404 (FIG. 4) as instructed by a media player client implemented on device 502 and/or server 506. In addition, one or more steps of a process may be incorporated into or combined with one or more steps of any other process or embodiment (e.g., steps from process 600 may be combined with steps from process 800). In addition, the steps and descriptions described in relation to FIGS. 6-9 may be done in alternative orders or in parallel to further the purposes of this disclosure. For example, each of these steps may be performed in any order or in parallel or substantially simultaneously to reduce lag or increase the speed of the system or method.

The processes discussed above are intended to be illustrative and not limiting. One skilled in the art would appreciate that the steps of the processes discussed herein may be omitted, modified, combined, and/or rearranged, and any additional steps may be performed, without departing from the scope of the invention. More generally, the above disclosure is meant to be exemplary and not limiting. Only the claims that follow are meant to set bounds as to what the present invention includes. In addition, the systems and methods described herein may be performed in real time. It should also be noted, the systems and/or methods described above may be applied to, or used in accordance with, other systems and/or methods.

What is claimed is:

1. A method comprising:
- training, based on a plurality of training data structures of a user profile, a machine learning model to classify a scene, wherein the machine learning model is configured to:
  - receive an input data structure; and
  - output an output binary classifier indicating whether a scene change is recommended;
- receiving a first scene change request for a first scene of a media asset;
- generating a first data structure, wherein the first data structure indicates metadata for the first scene;
- inputting the first data structure into the machine learning model; and
- receiving a binary operator indicating that the first scene should not be skipped.

2. The method of claim 1 wherein the training the machine learning model to classify the scene comprises:
- identifying a plurality of scene change requests in a viewing history associated with the user profile; and
- for each respective scene change request of the plurality of scene change requests:
  - determining a respective scene category of the respective scene associated with the scene change request; and
  - generating a respective training data structure of the plurality of training data structures, wherein the respective training data structure comprises the respective scene category of the respective scene associated with the scene change request and the respective scene change request.

3. The method of claim 2 wherein the training the machine learning model to classify the scene further comprises:
- identifying a plurality of unskipped scenes in a viewing history associated with the user profile; and
- for each respective unskipped scenes of the plurality of unskipped scenes:
  - determining a respective scene category of the respective unskipped scene; and
  - generating a respective training data structure of the plurality of training data structures, wherein the respective training data structure comprises the respective scene category of the respective unskipped scene and an indicator that a scene change request was not received.

4. The method of claim 3 wherein the outputting the output binary classifier indicating whether a scene change is recommended comprises:
- determining that the input data structure comprises a first scene category;
- determining, by the machine learning model, that the first scene category corresponds to a scene category associated with a scene change request; and
- wherein the binary operator indicates that the scene change is recommended.

5. The method of claim 3 wherein the outputting the output binary classifier indicating whether a scene change is recommended comprises:
- determining that the input data structure comprises a first scene category;
- determining, by the machine learning model, that the first scene category corresponds to a scene category associated with at least one of the unskipped scenes of the plurality of unskipped scenes; and
- wherein the binary operator indicates that the scene change is not recommended.

6. The method of claim 1 wherein the training the machine learning model to classify the scene comprises:
- identifying a scene change request associated with a second scene in a viewing history associated with the user profile;
- determining a sequence of scenes preceding the second scene; and
- determining a plurality of scene categories associated with the sequence of scenes preceding the second scene; and generating a respective training data structure of the plurality of training data structures, wherein the respective training data structure comprises the plurality of scene categories associated with the sequence of scenes preceding the second scene and the respective scene change request.

7. The method of claim 1 further comprising generating for display a warning that the scene change is not recommended.

8. The method of claim 1 wherein the generating the first data structure comprises:

determining, based on metadata of the media asset, a plurality of categories for a sequence of scenes preceding the first scene.

9. The method of claim 1 further comprising:

in response to receiving the binary operator indicating that the first scene should not be skipped, executing a modified scene change request.

10. The method of claim 9, wherein the first scene change request comprises a fast-forwarding request, wherein executing the modified scene change request comprises:

determining a number of frames skipped in a period of time for a fast-forward request; and modifying the fast-forwarding request by reducing the number of frames skipped in the period of time.

11. A system comprising:

control circuitry configured to:

train, based on a plurality of training data structures of a user profile, a machine learning model to classify a scene, wherein the machine learning model is configured to:

receive an input data structure; and output an output binary classifier indicating whether a scene change is recommended;

input/output circuitry configured to:

receive a first scene change request for a first scene of a media asset;

the control circuitry further configured to:

generate a first data structure, wherein the first data structure indicates metadata for the first scene;

input the first data structure into the machine learning model; and receive a binary operator indicating that the first scene should not be skipped.

12. The system of claim 11 wherein the control circuitry is configured to train the machine learning model to classify the scene by:

identifying a plurality of scene change requests in a viewing history associated with the user profile; and for each respective scene change request of the plurality of scene change requests:

determining a respective scene category of the respective scene associated with the scene change request; and generating a respective training data structure of the plurality of training data structures, wherein the respective training data structure comprises the respective scene category of the respective scene associated with the scene change request and the respective scene change request.

13. The system of claim 12 wherein the control circuitry is further configured to train the machine learning model to classify the scene by:

identifying a plurality of unskipped scenes in a viewing history associated with the user profile; and for each respective unskipped scenes of the plurality of unskipped scenes:

determining a respective scene category of the respective unskipped scene; and generating a respective training data structure of the plurality of training data structures, wherein the respective training data structure comprises the respective scene category of the respective unskipped scene and an indicator that a scene change request was not received.

14. The system of claim 13 wherein the control circuitry is configured to output the output binary classifier indicating whether a scene change is recommended by:

determining that the input data structure comprises a first scene category;

determining, by the machine learning model, that the first scene category corresponds to a scene category associated with a scene change request; and wherein the binary operator indicates that the scene change is recommended.

15. The system of claim 13 wherein the control circuitry is configured to output the output binary classifier indicating whether a scene change is recommended by:

determining that the input data structure comprises a first scene category;

determining, by the machine learning model, that the first scene category corresponds to a scene category associated with at least one of the unskipped scenes of the plurality of unskipped scenes; and wherein the binary operator indicates that the scene change is not recommended.

16. The system of claim 11 wherein the control circuitry is configured to train the machine learning model to classify the scene by:

identifying a scene change request associated with a second scene in a viewing history associated with the user profile;

determining a sequence of scenes preceding the second scene; and determining a plurality of scene categories associated with the sequence of scenes preceding the second scene; and generating a respective training data structure of the plurality of training data structures, wherein the respective training data structure comprises the plurality of scene categories associated with the sequence of scenes preceding the second scene and the respective scene change request.

17. The system of claim 11 wherein the control circuitry is further configured to generate for display a warning that the scene change is not recommended.

18. The system of claim 11 wherein the control circuitry is configured to generate the first data structure by:

determining, based on metadata of the media asset, a plurality of categories for a sequence of scenes preceding the first scene.

19. The system of claim 11 wherein the control circuitry is further configured to:

in response to receiving the binary operator indicating that the first scene should not be skipped, executing a modified scene change request.

20. The system of claim 19, wherein the first scene change request comprises a fast-forwarding request, and wherein the control circuitry is configured to execute the modified scene change request by:

determining a number of frames skipped in a period of time for a fast-forward request; and modifying the fast-forwarding request by reducing the number of frames skipped in the period of time.

* * * * *